(12) United States Patent
Patel et al.

(10) Patent No.: US 11,490,381 B2
(45) Date of Patent: Nov. 1, 2022

(54) SYSTEMS AND METHODS FOR DYNAMIC SPECTRUM SHARING ("DSS") INTERLEAVING AND PRE-SCHEDULING TO OPTIMIZE RESOURCE UTILIZATION

(71) Applicant: Verizon Patent and Licensing Inc., Arlington, VA (US)

(72) Inventors: Nischal Patel, Gilberts, IL (US); Xin Wang, Morris Plains, NJ (US); Monte Giles, Chester, NJ (US); Susan Wu Sanders, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 363 days.

(21) Appl. No.: 16/850,483

(22) Filed: Apr. 16, 2020

(65) Prior Publication Data
US 2021/0329631 A1 Oct. 21, 2021

(51) Int. Cl.
*H04W 72/04* (2009.01)
(52) U.S. Cl.
CPC ..... *H04W 72/0446* (2013.01); *H04W 72/042* (2013.01)
(58) Field of Classification Search
CPC .................... H04W 72/0446; H04W 72/042
See application file for complete search history.

(56) References Cited

PUBLICATIONS

Neerja Kumar et al., 'Survey of Downlink Control Channel Resource Allocation Techniques in LTE', IEEE INDICON 2015, pp. 1-5. (Year: 2015).*
Patrick Hosein, 'Resource Allocation for the LTE Physical Downlink Control Channel', IEEE, 2009, pp. 1-5. (Year: 2009).*
Li Li et al., 'Multi-User Resource Allocation for Downlink Control Channel in LTE Systems', 2010 IEEE 21st International Symposium on Personal Indoor and Mobile Radio Communications, pp. 1-5. (Year: 2010).*

* cited by examiner

*Primary Examiner* — Melvin C Marcelo

(57) ABSTRACT

A system described herein may provide a scheduling technique for physical radio frequency ("RF") resources of a base station of a radio access network ("RAN") of a wireless network. Resources for a first group of User Equipment ("UEs") may be allocated during or prior to a first time slot, and the UEs may be notified during the first time slot of the allocated resources. The allocated resources may be provided during a subsequent second time slot. A second group of UEs may be notified, during the first time slot, of physical RF resources allocated for downlink data for the second group of resources, and such downlink data may be provided to the second group of UEs during the first time slot via the allocated physical RF resources. The assignments of the UEs to the respective groups may change over time based on network load or other metrics.

20 Claims, 14 Drawing Sheets

SYSTEMS AND METHODS FOR DYNAMIC SPECTRUM SHARING ("DSS") INTERLEAVING AND PRE-SCHEDULING TO OPTIMIZE RESOURCE UTILIZATION

BACKGROUND

Wireless networks may offer wireless service according to multiple radio access technologies ("RATs"), such as Long-Term Evolution ("LTE") RATs, Fifth Generation ("5G") RATs, and/or other RATs. Different RATs may have different attributes and may therefore offer differentiated services. For example, 5G RATs may offer relatively high throughput and/or low latency services. Some User Equipment ("UE"), such as mobile phones, may operate according to one particular RAT, or may be a dual-mode or multi-mode UE that operates according to multiple RATs.

DETAILED DESCRIPTION OF THE PREFERRED EMBODIMENTS

The following detailed description refers to the accompanying drawings. The same reference numbers in different drawings may identify the same or similar elements.

Figure 1:
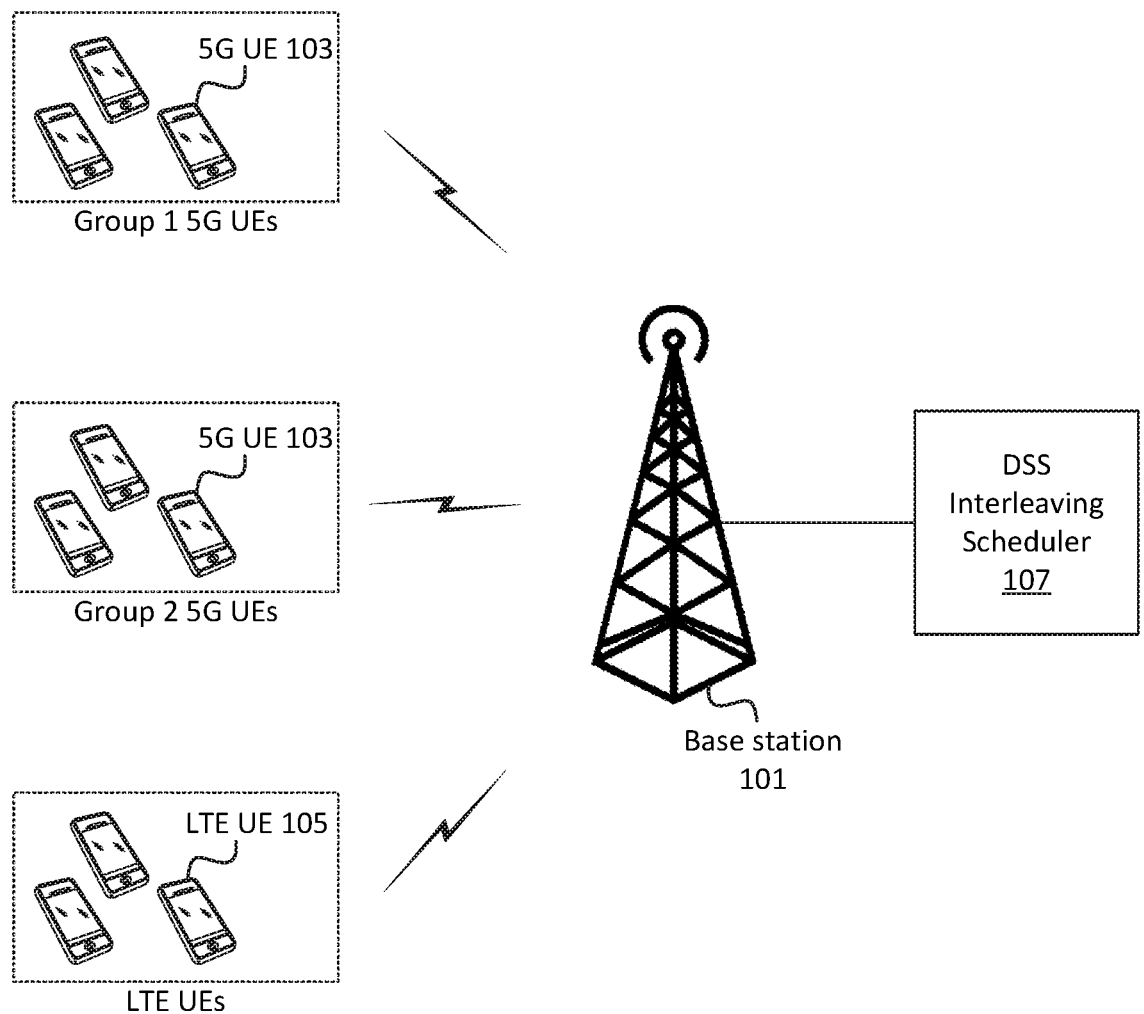
FIG. 1 illustrates an example overview of one or more embodiments described herein, in which a dynamic spectrum sharing ("DSS") interleaving scheduler ("DIS") may be communicatively coupled with a base station of a wireless telecommunications network that implements DSS, and may schedule radio frequency ("RF") resources of the base station for UEs that operate according to various RATs.

Embodiments described herein provide for the efficient utilization of RF resources associated with a base station, associated with a radio access network ("RAN") of a wireless telecommunications network, that implements DSS to provide wireless services to UEs according to multiple different RATs. For example, as shown in FIG. 1, base station 101 may be connected to UEs via a 5G RAT and a LTE RAT. UEs connected to base station 101 via a 5G RAT are referred to herein as "5G UEs 103" or simply as "UEs 103," and UEs connected to base station 101 via a LTE RAT are referred to herein as "LTE UEs 105" or simply as "UEs 105." In practice, a particular 5G UE 103 may be a dual- or multi-mode UE that is also capable of communicating using a LTE RAT. However, such UE may be referred to herein as "UE" 103 in the context of communications between the UE and base station 101 according to a 5G RAT. Similarly, a particular LTE UE 103 may be a dual- or multi-mode UE that is also capable of communicating using a 5G RAT.

As further shown in FIG. 1, DIS 107 may be communicatively coupled to base station 101. As described herein, and in accordance with some embodiments, DIS 107 may perform or facilitate scheduling operations of physical RF resources associated with base station 101. For example, DIS 107 may determine how to allocate portions of the RF spectrum, in the time and frequency domains, for downlink communications between base station 101 and the illustrated UEs (e.g., 5G UEs 103 and LTE UEs 105). For example, as described herein, DIS 107 may assign UEs 103 to multiple groups, and may perform scheduling operations based on resource requests from UEs 103 associated with these groups. In some embodiments, two groups may be assigned for UEs 103. Such groups are referred to herein as "Group 1" (or "G1") and "Group 2" (or "G2").

In some embodiments, DIS 107 may perform a load balancing or rebalancing technique to determine which UEs 103 should be assigned to which group. For example, DIS 107 may assign an equal quantity (or relatively equal quantity) of UEs to Groups 1 and 2. DIS 107 may, in some embodiments, rebalance the groups based on monitoring metrics associated with UEs 103 and/or base station 101. For example, DIS 107 may assign or reassign the groups based on an amount of control plane or user plane data sent to UEs 103. For example, if Group 1 and Group 2 contain the same quantity of UEs, but the amount of downlink data associated with Group 1 is 50% (or some other amount exceeding a threshold), DIS 107 may reassign one or more UEs of Group 1 to Group 2. In some embodiments, DIS 107 may identify particular UEs that have relatively high usage (e.g., relatively larger amounts of downlink data than other UEs), and reassign such UEs to the other group.

Figure 2:
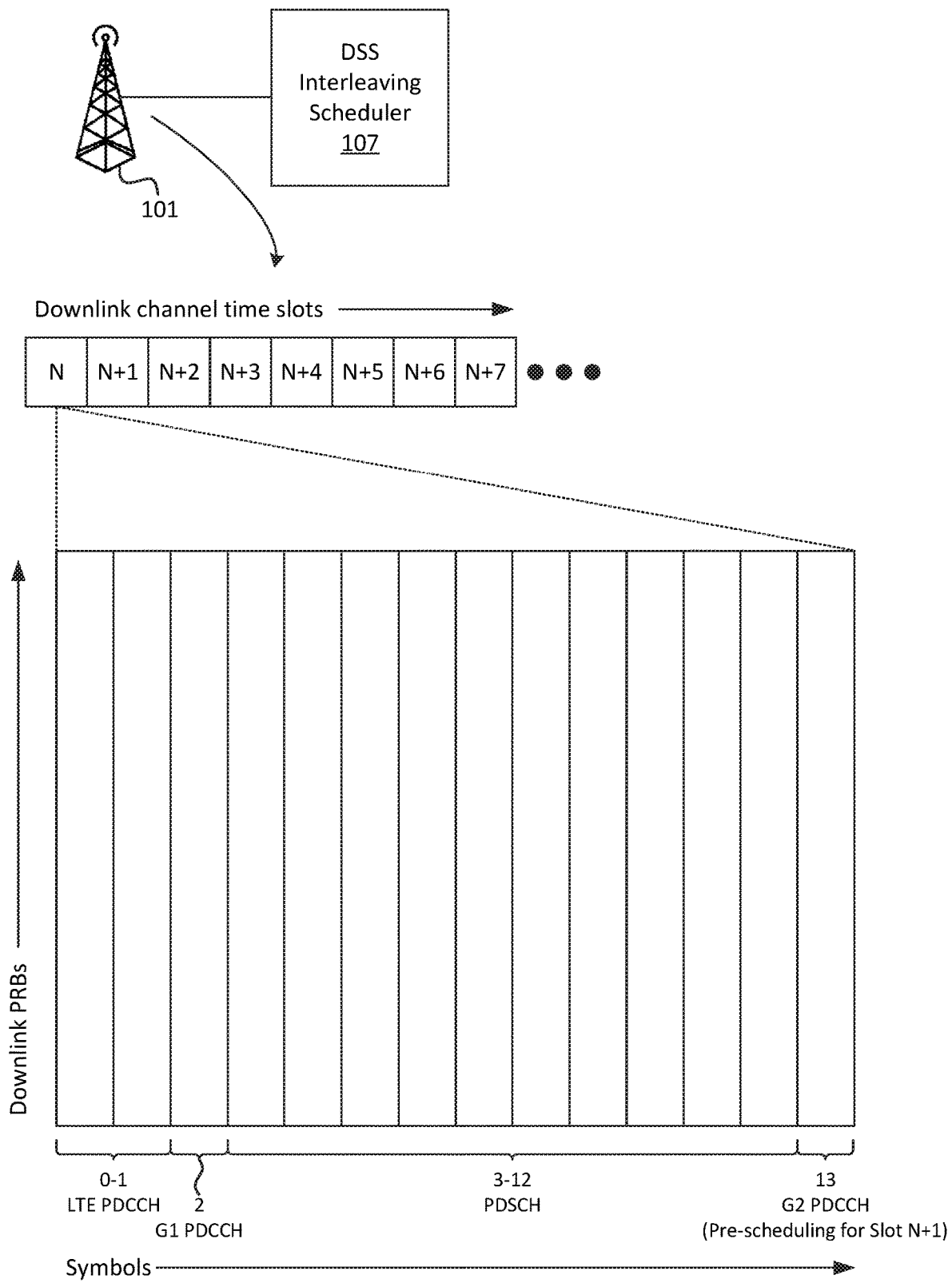
FIG. 2 illustrates an example of how downlink RF resources, associated with a base station, may be arranged, in accordance with some embodiments.

FIG. 2 illustrates an example of how DIS 107 may arrange the scheduling of physical RF downlink resources associated with LTE UE 105. The examples provided with respect to FIG. 2 are general in nature, and specific examples in accordance with some embodiments are described in greater detail below.

As mentioned above, the RF downlink resources associated with LTE UE 105 may be arranged in time and frequency domains. In the frequency domain, different portions of the RF spectrum may be divided or arranged into bands, sub-bands, or other ranges of frequencies. A Physical Resource Block ("PRB") may be one such arrangement of a range of frequencies.

In the time domain, the RF resources associated with base station 101 may be arranged in terms of time slots (referred to herein simply as "slots"). A first slot may be referred to as "Slot N," an immediately subsequent slot may be referred to as "slot N+1," the next slot may be referred to as "Slot N+2," and so on. Similarly, a preceding slot may be referred to as "Slot N−1." As shown in FIG. 2, a slot may be further subdivided in the time domain. As shown, a particular time domain subdivision may be referred to as a "symbol." For example, one slot may be divided into fourteen symbols (e.g., Symbols 0-13). Thus, during each slot, a particular PRB may carry fourteen discrete signals (i.e., one signal per symbol).

In accordance with some embodiments, the PRBs associated with base station 101 may be used for different downlink signals at different time locations (e.g., symbols) within each slot. For example, as shown, PRBs associated with base station 101 may be used for a Physical Downlink Control Channel ("PDCCH") for UEs 103 at symbols 0 and 1. As further shown, PRBs associated with base station 101 may be used for a PDCCH for Group 1 UEs 103 at Symbol 2, and PRBs associated with base station 101 may be used for a Physical Downlink Shared Channel ("PDSCH") at symbols 3-12. Additionally, Symbol 13 may be used for a PDCCH for Group 2 UEs 103.

The PDCCH may be used to provide scheduling information, timing information, and/or other suitable information to notify UEs of downlink resources for user plane data that have been allocated (or "granted") for the UEs. For example, a particular UE 105 may receive, via the PDCCH (e.g., at symbols 0 and/or 1), an indication of particular PRBs that base station 101 will use to implement a PDSCH to provide user plane data to LTE UE 105. While specific example scenarios are discussed below, generally speaking, the PRBs granted for the PDSCH may include some or all of the PRBs, associated with base station 101, at Symbols 2-13. For example, while symbols 3-12 are shown here as corresponding to a PDSCH, some implementations require a LTE PDSCH to be implemented by PRBs across Symbols 2-13. Thus, as described below, in situations where PRBs are not fully utilized at Symbols 2 and 13 (e.g., by PDCCHs associated with UEs 103), such PRBs may be utilized to implement the PDSCH associated with one or more UEs 105.

As further shown, base station 101 may provide, via a PDCCH implemented at Symbol 2, an indication of particular PRBs that base station 101 will use to implement a PDSCH to provide user plane data to a particular Group 1 UE 103. Symbols 3-12 may be used for the PDSCH to provide the user plane data to the particular Group 1 UE 103.

Additionally, slot 13 may be used for "pre-scheduling" of PDSCH resources for UEs 103. For example, as discussed below, base station 101 may provide, via PRBs at Symbol 13 of Slot N, an indication of PRBs that will be used on Slot N+1 to implement a PDSCH to provide user plane data to Group 2 UEs 103.

As discussed above, DIS 107 may assign or reassign UEs 103 to Groups 1 and/or 2. When assigning or reassigning groups, DIS 107 may notify (e.g., via Radio Resource Control ("RRC") signaling sent via base station 101) particular UEs 103 of which symbol to monitor for the PDCCH associated with the particular UE 103. In some embodiments, UEs 103 may maintain a mapping of groups to PDCCH symbols. In such embodiments, DIS 107 may notify UE 103 of which respective group to which UE 103 belongs, and UE 103 may monitor the respective symbol for PDCCH signaling.

Splitting UEs 103 into two groups, in accordance with some embodiments, allows for the enhanced utilization of PRBs associated with base station 101. For example, as noted above, some implementations require or restrict UEs 105 to utilize PRBs at all of Symbols 2-13 for a PDSCH. In such implementations, it is not possible for a given UE 105 to utilize, for example, symbols 3-12 for the PDSCH. Thus, if one or more PRBs are used at Symbols 2 and/or 13 (e.g., for a PDCCH for UEs 103), then those PRBs are not usable for a LTE PDSCH. The techniques described herein serve to minimize the occurrence of unused or unusable PRBs, and therefore enhance the resource utilization of base station 101.

Figure 3:
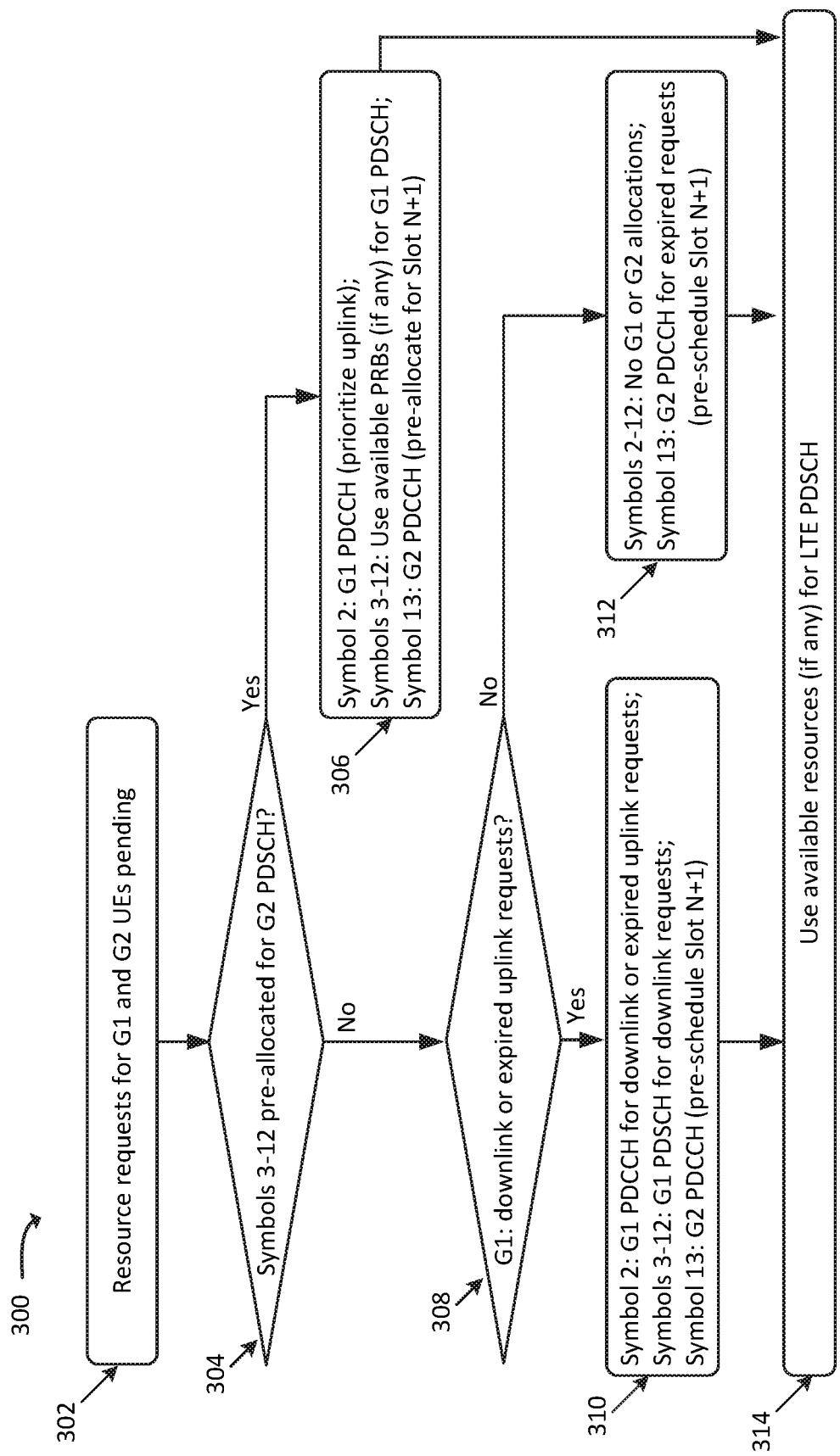
FIGS. 3-5 illustrate example processes which may reflect how requests for UEs may be handled in different scenarios, in accordance with some embodiments.
Figure 4:
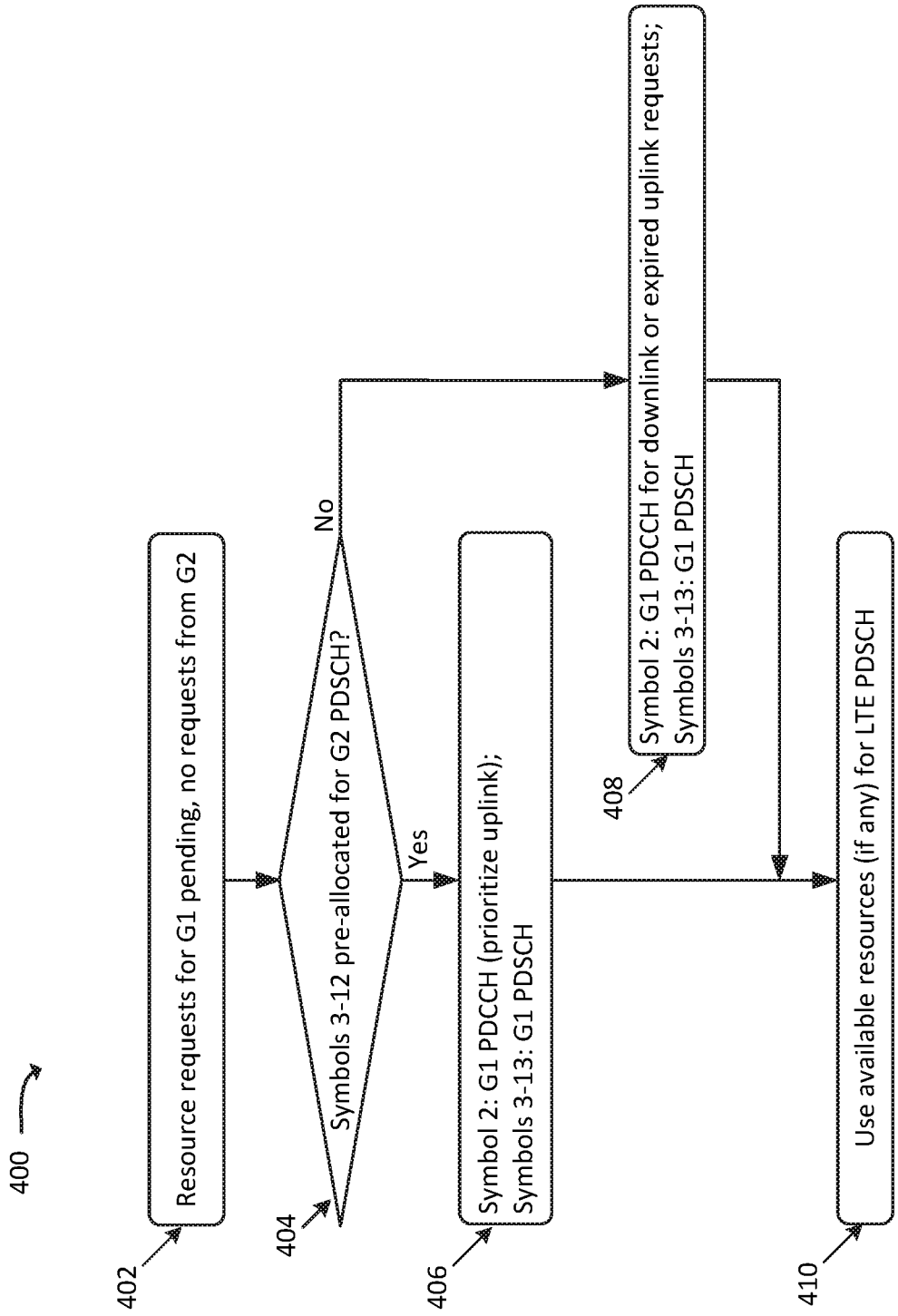
Figure 5:
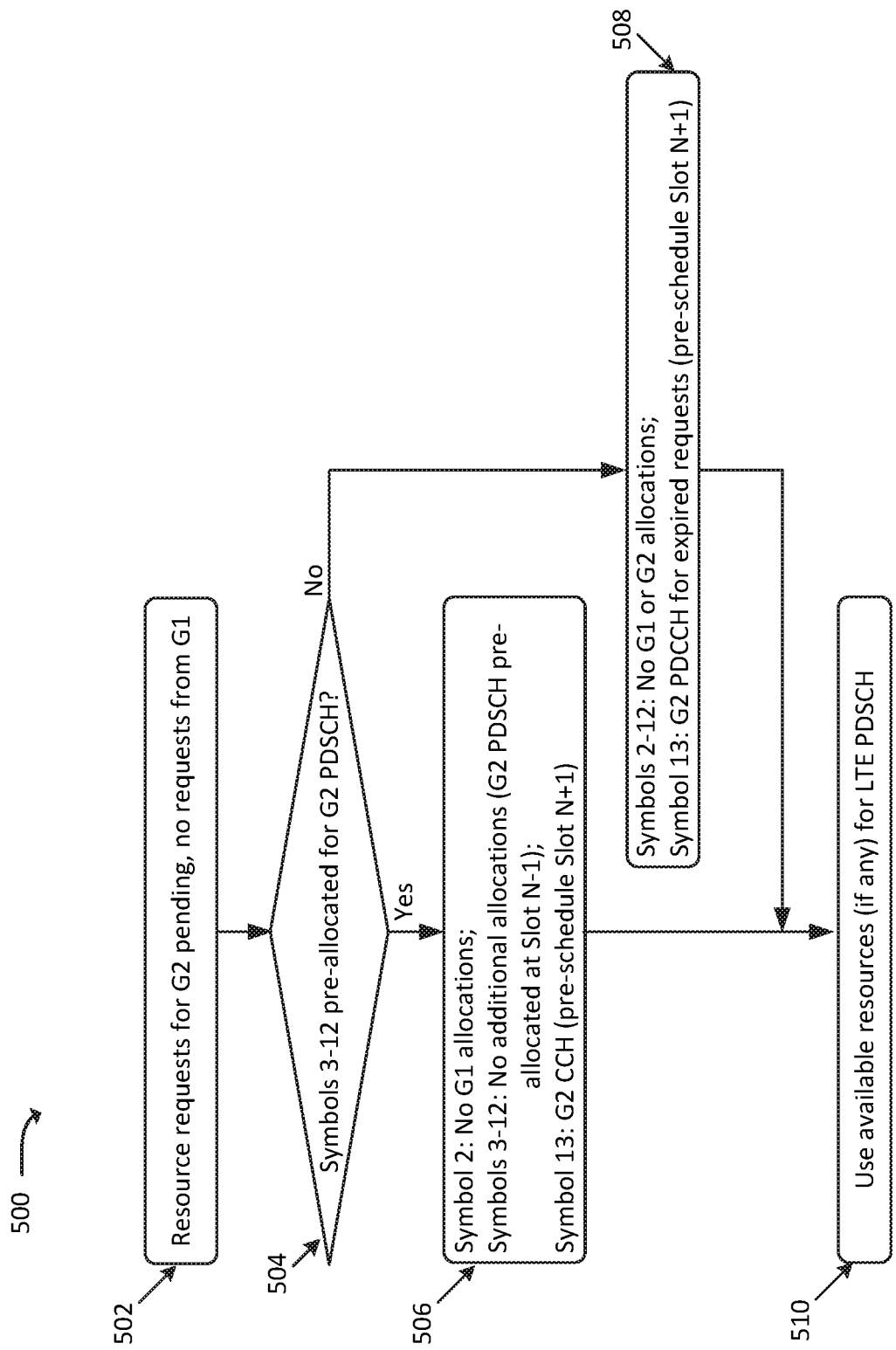

FIGS. 3-5 illustrate example processes 300, 400, and 500, which may reflect different scenarios that may occur, with respect to scheduling requests from UEs 103 of the different groups, at a given time slot. Process 300, illustrated in FIG. 3, may correspond to a situation where resource requests have been received and/or are pending, at a given Slot N, from UEs 103 of Groups 1 and 2. Process 400, illustrated in FIG. 4, may correspond to a situation where resource requests have been received and/or are pending, at a given Slot N, from UEs 103 of Group 1, but not of Group 2. Process 600, illustrated in FIG. 5, may correspond to a situation where resource requests have been received and/or are pending, at a given Slot N, from UEs 103 of Group 2, but not of Group 1. Processes 300, 400, and 500 may, in some embodiments, be performed by DIS 107. In some embodiments, some or all of processes 300, 400, and/or 500 may be performed by one or more other devices or systems in addition to, or in lieu of, DIS 107 (e.g., base station 101 and/or some other device or system).

As shown, process 300 may include receiving (at 302) resource requests associated with UEs 103 of Groups 1 and 2. The resource requests may include, for example, uplink resource requests received from UEs 103, and/or downlink resource requests received from a wireless network (e.g., a Downlink Data Notification received from a Mobility Management Entity ("MME"), Access and Mobility Management Function ("AMF"), or other suitable device or system).

Additionally, or alternatively, DIS 107 may determine that prior resource requests are pending (e.g., received during a prior time slot and not previously fulfilled) for UEs 103 of Groups 1 and 2. Generally, the resource requests may be requests for PRBs associated with base station 101, for the transmission of data (e.g., user plane data, such as voice call traffic, messaging traffic, content streaming traffic, etc.) to UEs 103.

Process 300 may further include determining (at 304) whether symbols 3-12, on the current slot, have been previously allocated for a PDSCH for UEs 103 of Group 2 (referred to below as "Group 2 UEs 103"). For example, as mentioned above, DIS 107 may, in some situations, pre-allocate (e.g., using a PDCCH at Slot N−1) PRBs at Slot N for a PDSCH for Group 2 UEs 103.

If PRBs at symbols 3-12 have been pre-allocated for a PDSCH for Group 2 UEs 103 (at 304—YES), then process 300 may additionally include using (at 306) PRBs of Symbol 2 on Slot N for a PDCCH for Group 1 UEs 103. For example, DIS 107 may instruct base station 101 to use some or all of the PRBs associated with base station 101, at Symbol 2, to provide scheduling signals to Group 1 UEs 103. In some embodiments, DIS 107 may prioritize uplink scheduling. For example, DIS 107 may utilize Symbol 2, at Slot N, for scheduling uplink resource grants associated with Group 1 UEs 103, before scheduling downlink resource grants associated with Group 1 UEs 103. That is, DIS 107 may utilize Symbol 2 to send control signaling, indicating available uplink resources for Group 1 UEs 103, before sending control signaling, indicating available downlink resources for Group 1 UEs 103. As another example, DIS 107 may more heavily weight uplink scheduling signals than downlink scheduling signals. As such, Symbol 2 may be used for control signaling indicating available uplink and downlink resources, but the amount of PRBs at Symbol 2 used for indicating uplink resource grants may be higher than the amount of PRBs at Symbol 2 used for indicating downlink resource grants.

DIS 107 may further use available PRBs of Symbols 3-12 to send downlink data (e.g., via a PDSCH) for Group 1 UEs 103. For example, although some PRBs on Symbols 3-12 may have been pre-allocated (at Slot N−1) for a PDSCH for Group 2 UEs 103, some PRBs on Symbols 3-12 may still be available (e.g., not allocated to Group 2 UEs 103). In such a scenario, DIS 107 may allocate these PRBs (on Symbols 3-12) for use by Group 1 UEs 103 (e.g., for a PDSCH for these UEs). Further, DIS 107 may utilize one or more PRBs of Symbol 13 for scheduling (e.g., for a PDCCH) for Group 2 UEs 103. In other words, DIS 107 may utilize PRBs of Symbol 13, on Slot N, to pre-allocate PRBs (e.g., on Symbols 3-12) of Slot N+1 for a PDSCH for Group 2 UEs 103.

In some embodiments, when allocating (at 306) PRBs at Symbol 13 for the PDCCH for Group 2 UEs 103, DIS 107 may utilize only the PRBs that have been allocated for the PDCCH for Group 1 UEs 103 (at Symbol 2) and/or for the PDSCH for Group 2 UEs 103 (at Symbols 3-12). In this manner, the quantity of PRBs that are available, for use for a PDSCH for LTE UEs 105 on Symbols 2-13, may be maximized. An example of such allocations (performed at 306) is provided below with respect to FIG. 11.

If, on the other hand, Symbols 3-12 have not been previously allocated (at 304—NO), then DIS 107 may determine (at 308) whether the pending requests for Group 1 UEs 103 include downlink requests and/or expired uplink requests. For example, a request (such as an uplink data request) may be "expired" if the request was received at least a threshold amount of time before Slot N and/or during at least a threshold quantity of slots prior to Slot N (e.g., at Slot N−1, Slot N−2, etc.).

DIS 107 may allocate (at 310) one or more PRBs of Symbol 2, at Slot N, for scheduling of requests associated with Group 1 UEs 103 (e.g., for downlink requests and/or expired uplink requests). That is, Symbol 2 may be used for a PDCCH for Group 1 UEs 103. In some embodiments, DIS 107 may prioritize (at 310) downlink data requests over uplink data requests. In some embodiments, DIS 107 may only provide uplink scheduling signals (via the PDCCH at Symbol 2 of Slot N) for expired uplink data requests (e.g., not for unexpired uplink data requests).

Further, since PRBs of Symbols 3-12 are available (at 304—NO), DIS 107 may further allocate (at 310) some or all PRBs of Symbols 3-12 for a PDSCH to carry downlink data (e.g., user data) for Group 1 UEs 103. Further, DIS 107 may allocate some or all PRBs of Symbol 13 for a PDCCH to carry scheduling signals associated with Group 2 UEs 103. Examples of such allocations (performed at 310) are provided below with respect to FIGS. 8A-8C.

In some embodiments, if the pending requests (received or identified at 302) associated with Group 2 UEs 103 have not expired, DIS 107 may utilize PRBs of Symbol 13 to implement a PDSCH to carry downlink data for Group 1 UEs 103. An example of such an allocation (performed at 310) is provided below with respect to FIG. 8D. In some embodiments, DIS 107 may utilize Symbol 13 for the PDCCH for Group 2 UEs 103 regardless of whether the requests associated with Group 2 UEs 103 have expired or not.

In some scenarios, no downlink or expired uplink requests may be pending for Group 1 UEs 103 (e.g., at 308—NO). That is, only unexpired uplink requests may be pending for Group 1 UEs 103. In such a scenario, DIS 107 may allocate PRBs of Symbol 13 for requests, associated with Group 2 UEs 103, that have expired (e.g., have been pending for at least a threshold amount of time or threshold quantity of time slots). Further, DIS 107 may refrain from allocating PRBs on Symbols 2-12 on Slot N for Group 1 or Group 2 UEs 103. In some embodiments, DIS 107 may further refrain from allocating (at 312) PRBs on Symbol 13 for Group 2 UEs 103 if the pending requests for Group 2 UEs 103 are unexpired. Examples of such allocations (performed at 312) are provided below with respect to FIGS. 9A and 9B.

As further shown, DIS 107 may allocate (at 314) remaining resources to implement a PDSCH to carry downlink data associated with one or more LTE UEs 105. For example, as discussed above, PRBs that are available (e.g., have not been allocated for other purposes) across Symbols 2-13 may be allocable to LTE UEs 105.

As shown in FIG. 4, process 400 may include receiving (at 402) resource requests associated with Group 1 UEs 103, and/or identifying that resource requests for Group 1 UEs 103 are pending. Further, in this example scenario, no resource requests from Group 2 UEs 103 may have been received during this particular time slot, and no resource requests from Group 2 UEs 103 are pending from a previous time slot. As noted above, the resource requests may include, for example, uplink resource requests received from UEs 103, and/or downlink resource requests received from a MME, AMF, or other suitable device or system.

Process 400 may further include determining (at 404) whether symbols 3-12, on the current slot, have been previously allocated for a PDSCH for Group 2 UEs 103. For example, as mentioned above, DIS 107 may, in some situations, have pre-allocated (e.g., using a PDCCH at Slot N−1) PRBs at Slot N for a PDSCH for Group 2 UEs 103.

If PRBs at symbols 3-12 have been pre-allocated for a PDSCH for Group 2 UEs 103 (at 404—YES), then process 400 may additionally include using (at 406) PRBs of Symbol 2 at the current slot (e.g., Slot N) for scheduling shared channel resources for downlink data for Group 1 UEs 103. In other words, DIS 107 may allocate some or all PRBs, on Symbol 2 at slot N, for a PDCCH to carry scheduling signals for Group 1 UEs 103, indicating PRBs that will be used for a PDSCH to carry downlink data for Group 1 UEs 103. Further, DIS 107 may allocate (at 406) some or all PRBs of Symbols 3-13 for a PDSCH to carry downlink data (e.g., user plane data) for Group 1 UEs 103. As similarly described above, when allocating (at 406) PRBs of Symbol 2 for the PDCCH for Group 1 UEs 103, DIS 107 may prioritize uplink scheduling requests over downlink scheduling requests. An example of such allocations (performed at 406) is provided below with respect to FIG. 12.

If, on the other hand, Symbols 3-12 have not been previously allocated (at 404—NO), then DIS 107 may allocate (at 408) PRBs of Symbol 2 for a PDCCH to carry scheduling signals for Group 1 UEs 103. As similarly described above, scheduling signals for downlink data may be prioritized over scheduling signals for uplink data. As also described above, DIS 107 use the PDCCH (at Symbol 2) for uplink requests that have expired, but may refrain from using the PDCCH for uplink requests that have not expired. As may be apparent, these uplink requests may be fulfilled at a later time when they expire (e.g., at 310 or 408), or when other conditions are met (e.g., at 306 and/or 406).

Further, as Symbols 3-12 have not been previously allocated, and since there is no scheduling for Group 2 UEs 103 to perform at Slot N (e.g., because no requests from Group 2 UEs 103 have been received (at 402)), PRBs on Symbols 3-13 may be available. As such DIS 107 may further utilize (at 408) PRBs on Symbols 3-13 for downlink data for Group 1 UEs 103. In other words, DIS 107 may allocate PRBs on Symbols 3-13 for a PDSCH to carry downlink data for Group 1 UEs 103. Examples of such allocations (performed at 408) are provided below with respect to FIGS. 7A-7D.

In some situations (e.g., where no downlink requests or expired uplink requests are pending for Group 1 UEs 103), DIS 107 may refrain (at 408) from allocating PRBs of Symbols 3-13 for the PDSCH for Group 1 UEs 103. In such a scenario, such PRBs of Symbols 3-13 may be available for allocating (at 410) a PDSCH of LTE UEs (e.g., where corresponding PRBs are available at Symbol 2). An example of such an allocation (performed at 410) are provided below with respect to FIG. 6.

Once DIS 107 has performed (at 406 or 408) the allocations of PRBs on Symbols 2-13, DIS 107 may allocate (at 410) any remaining PRBs for downlink data for LTE UEs 105. For example, if any PRBs are available across Symbols 2-13, such PRBs may be used for a PDSCH for LTE UEs 105.

As shown in FIG. 5, process 500 may include receiving (at 502) resource requests associated with Group 2 UEs 103, and/or identifying that resource requests for Group 2 UEs 103 are pending. Further, in this example scenario, no resource requests from Group 1 UEs 103 may have been received during this particular time slot, and no resource requests from Group 1 UEs 103 are pending from a previous time slot. As noted above, the resource requests may include, for example, uplink resource requests received from UEs 103, and/or downlink resource requests received from a MME, AMF, or other suitable device or system.

Process 500 may further include determining (at 504) whether symbols 3-12, on the current slot, have been previously allocated for a PDSCH for Group 2 UEs 103. For example, as mentioned above, DIS 107 may, in some situations, have pre-allocated (e.g., using a PDCCH at Slot N−1) PRBs at Slot N for a PDSCH for Group 2 UEs 103.

If PRBs at symbols 3-12 have been pre-allocated for a PDSCH for Group 2 UEs 103 (at 504—YES), then process 500 may additionally include using (at 506) PRBs of Symbol 13 to pre-schedule downlink data for the next time slot (e.g., Slot N+1) for Group 2 UEs 103 (e.g., based on requests received or identified (at 502) for Group 2 UEs 103). Since no requests from Group 1 UEs 103 have been received or identified (at 502) on the current time slot, DIS 107 may refrain from allocating PRBs of Symbol 2 (e.g., for a PDCCH for Group 1 UEs 103).

In some embodiments, when allocating (at 506) PRBs at Symbol 13 for the PDCCH for Group 2 UEs 103, DIS 107 may utilize only the PRBs that have been allocated for the PDCCH for Group 1 UEs 103 (at Symbol 2) and/or for the PDSCH for Group 2 UEs 103 (at Symbols 3-12). In this manner, the quantity of PRBs that are available, for use for a PDSCH for LTE UEs 105 on Symbols 2-13, may be maximized. Examples of such allocations (performed at 506) are provided below with respect to FIGS. 13A-13C.

If, on the other hand, Symbols 3-12 have not been previously allocated (at 504—NO), then DIS 107 may allocate (at 508) PRBs of Symbol 13 for a PDCCH to carry scheduling signals for Group 2 UEs 103, for Slot N+1. Specifically, for instance, DIS 107 may allocate PRBs of Symbol 13 for requests, associated with Group 2 UEs 103, that have expired (e.g., have been pending for at least a threshold amount of time or threshold quantity of time slots). Further, DIS 107 may refrain from allocating PRBs on Symbols 2-12 on Slot N for Group 1 or Group 2 UEs 103. In some embodiments, DIS 107 may further refrain from allocating (at 508) PRBs on Symbol 13 for Group 2 UEs 103 if the pending requests for Group 2 UEs 103 are unexpired. Examples of such allocations (performed at 508) are provided below with respect to FIGS. 9A and 9B.

In situations where no expired requests for Group 2 UEs 103 are pending, the entirety of the spectrum on Slot N (e.g., all PRBs on Symbols 2-13) may be available for use (at 510) for a PDSCH for LTE UEs 105. In situations where PRBs are utilized (at 508) on Symbol 13 for expired Group 2 UE 103 scheduling (e.g., a PDCCH for Group 2 UEs 103), such PRBs may be unavailable for use (at 510) for a PDSCH for LTE UEs 105.

Figure 6:
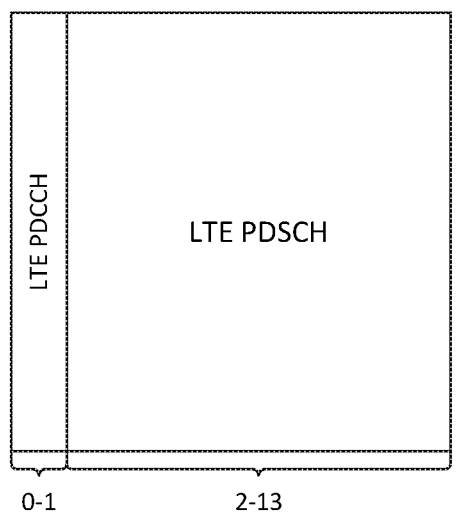
FIG. 6 illustrates an example resource allocation in a scenario where resource requests from a first group of 5G UEs are pending and resource requests are not pending from a second group of 5G UEs on a current time slot, in accordance with some embodiments.

FIGS. 6-13C conceptually illustrate example allocations in scenarios that reflect the above processes 300, 400, and 500. FIG. 6 conceptually illustrates, for example, a scenario in which one or more requests for Group 1 UEs 103 have been received or are pending on a present time slot (referred to as Slot N). FIG. 6 may represent, in the context of process 400, block 410, reached after block 404—NO, and further if PRBs of Symbol 2 have not been allocated (at 408) for a PDCCH for Group 1 UEs 103 (e.g., no downlink or expired uplink requests are pending for Group 1 UEs 103).

In this example, the pending requests for UEs 103 may be unexpired uplink requests, and may not include downlink requests. Further assume, for this example, that no requests for Group 2 UEs 103 have been received or are pending. Further, in this example, no PRBs on Symbols 3-12 have been previously scheduled for a PDSCH for Group 2 UEs 103. As such, the entirety of Symbols 2-13 may be available for a PDSCH to carry downlink data for LTE UEs 105. As discussed above, Symbols 0-1 may be used for a PDCCH to carry scheduling information for LTE UEs 105.

Figure 7A:
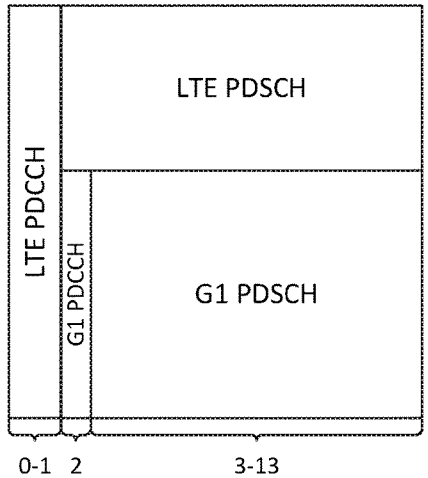
FIGS. 7A-7D illustrate example resource allocations in scenarios where resource requests from a first group of 5G UEs are pending and resource requests are not pending from a second group of 5G UEs on a current time slot, in accordance with some embodiments.
Figure 7B:
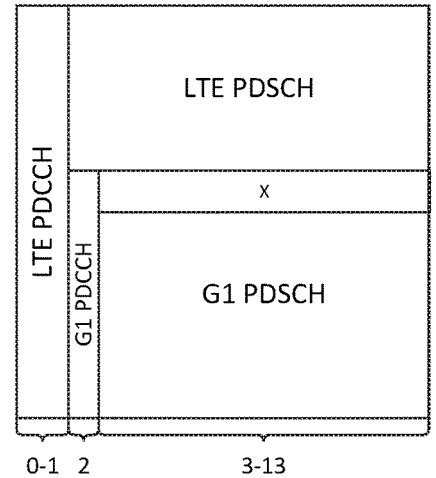
Figure 7C:
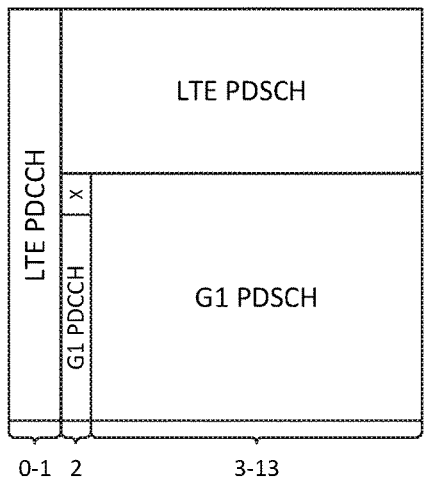

FIGS. 7A-7D conceptually illustrate scenarios in which one or more requests for Group 1 UEs 103 have been received or are pending on a present time slot. FIGS. 7A-7C may represent, in the context of process 400, block 410, reached after block 404—NO, and further if downlink and/or expired uplink requests are pending for Group 1 UEs 103 (e.g., PRBs on Symbols 3-13 are allocated as a PDSCH for Group 1 UEs 103 (at 408)).

Figure 7D:
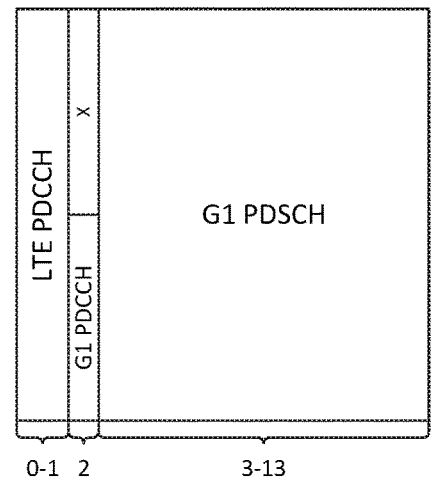

As shown in FIG. 7A, DIS 107 may allocate the same PRBs for the PDCCH (at Symbol 2) and the PDSCH (at Symbols 3-13). Accordingly, the remaining PRBs may be available for a PDSCH for downlink data for LTE UEs 105. FIG. 7B illustrates an example scenario in which DIS 107 allocates additional PRBs for the PDCCH (at Symbol 2) than for the PDSCH (at Symbols 3-13). In this scenario, such PRBs may be unused (denoted by the "X" in the figure). For example, some implementations may require the LTE PDSCH to utilize PRBs across all of Symbols 2-13, and since some PRBs (which are available at Symbols 3-13) are not available at Symbol 2, such PRBs may be unavailable for the LTE PDSCH. Similarly, in FIG. 7C, more PRBs may be allocated (at Symbols 3-13) for the PDSCH than for the PDCCH (at Symbol 2), and may therefore be unused and/or unavailable for the LTE PDSCH. FIG. 7D illustrates an example allocation in which all PRBs are allocated for the PDSCH for Group 1 UEs 103 (at Symbols 3-13), and no PRBs are resultingly available for the LTE PDSCH in this time slot.

Figure 8A:
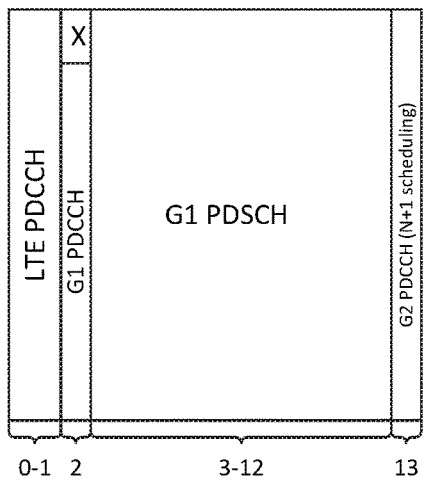
FIGS. 8A-8D illustrate example resource allocations in scenarios where resource requests from the first and second groups of 5G UEs are pending on a current time slot, in accordance with some embodiments.
Figure 8B:
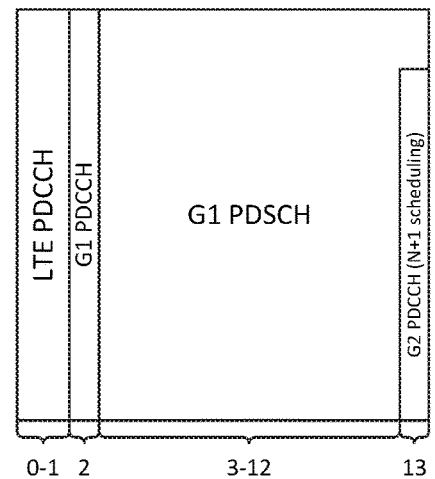
Figure 8C:
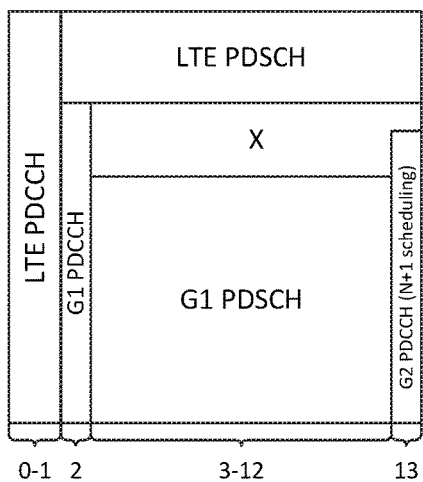

FIGS. 8A-8D conceptually illustrate scenarios in which one or more requests for Group 1 UEs 103 have been received or are pending on a present time slot, and one or more requests for Group 2 UEs 103 are pending on the present time slot. Further, FIGS. 8A-8D correspond to scenarios in which the requests associated with Group 1 UEs 103 include downlink requests or expired uplink requests (e.g., as reflected at block 310 of process 300). FIGS. 8A-8C correspond to scenarios in which requests associated with Group 2 UEs 103 include expired requests, and FIG. 8D corresponds to an example scenario in which the requests associated with Group 2 UEs do not include expired requests. As mentioned above, in some embodiments, Symbol 13 may be used (e.g., as shown in example FIGS. 8A-8C) for a PDCCH associated with Group 2 UEs 103, regardless of whether such requests have expired or not.

For example, as shown in FIG. 8A, PRBs may be allocated at Symbols 2 and/or 13 for the PDCCHs associated with Group 1 UEs 103 and Group 2 UEs 103, respectively, and all available PRBs may be allocated at Symbols 3-12 for the PDSCH for Group 1 UEs 103. In this example, all PRBs are utilized at Symbol 13 for the PDCCH for Group 2 UEs 103, and not all PRBs are utilized at Symbol 2 for the PDCCH for Group 1 UEs 103. Accordingly, in this example, some PRBs may be unused at Symbol 2.

In FIG. 8B, all PRBs may be utilized at Symbol 2 for the PDCCH for Group 1 UEs 103, and not all PRBs may be utilized at Symbol 13 for the PDCCH for Group 2 UEs 103. Accordingly, in addition to the PRBs at Symbols 3-12, some PRBs may be utilized at Symbol 13 for the PDSCH for Group 1 UEs 103.

In FIG. 8C, some, but not all, PRBs may be utilized at Symbols 2 and 13 for the PDCCHs for Group 1 UEs 103 and Group 2 UEs 103, respectively. Accordingly, some PRBs may be available (i.e., at Symbols 2-13) for the PDSCH for LTE UEs 105. As further shown in this figure, some PRBs may be unused on some symbols (e.g., unused at Symbols 3-12 and/or at Symbol 13). For example, if the downlink data for Group 1 UEs 103 (at Symbols 3-12) does not occupy the same quantity of PRBs as utilized by the PDCCHs for Group 1 UEs 103 (at Symbol 2) and/or for Group 2 UEs 103 (at Symbol 13), such excess PRBs may not be available for the PDSCH for LTE UEs 105 (indicated by the "X" in the figure). In some embodiments, when allocating PRBs on Symbol 13, DIS 107 may select from only those PRBs that have also been allocated on Symbol 2 for the PDCCH for Group 1 UEs 103. For example, DIS 107 may select from such PRBs to allow for other PRBs to potentially be utilized for the PDSCH for LTE UEs 105 (e.g., in implementations where all of Symbols 2-13 are required to be used for the PDSCH for LTE UEs 105).

As noted above, FIG. 8D illustrates a scenario in which the requests associated with Group 2 UEs 103 do not include expired requests (e.g., at block 310). As such, in some embodiments, DIS 107 may refrain from utilizing PRBs of Symbol 13 for a PDCCH for Group 2 UEs 103. Resultingly, such PRBs on Symbol 13 may be available for utilization for downlink data for Group 1 UEs 103. It should be noted that the examples laid out in FIGS. 7A-7D may also reflect example allocations that may occur in this situation, and FIG. 8D also reflects an example allocation that may occur in the scenario described above as corresponding to FIGS. 7A-7D.

Figure 8D:
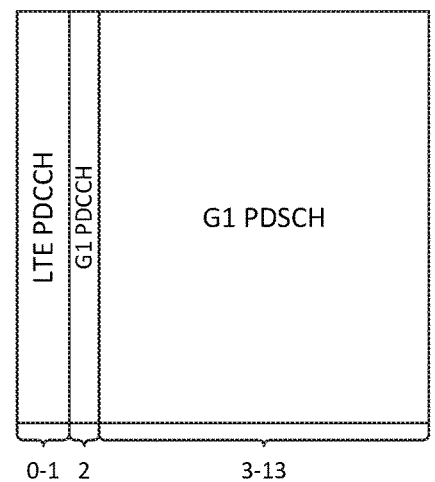

For example, while FIG. 8D illustrates an example in which DIS 107 may utilize all PRBs on Symbol 2 for the PDCCH for Group 1 UEs 103 and all PRBs on Symbols 3-13 for the PDSCH for Group 1 UEs 103, DIS 107 may allocate some PRBs differently, which may allow for some PRBs to be utilized (on Symbols 2-13) for a PDSCH for LTE UEs 105 (e.g., as shown in FIGS. 7A-7C). Further, FIG. 7D illustrates an example allocation which may occur when DIS 107 allocates some PRBs on Symbol 2 for the PDCCH for Group 1 UEs 103 (e.g., when requests are pending for Group 2 UEs 103 but are not expired and are therefore not scheduled at the current slot).

Figure 9A:
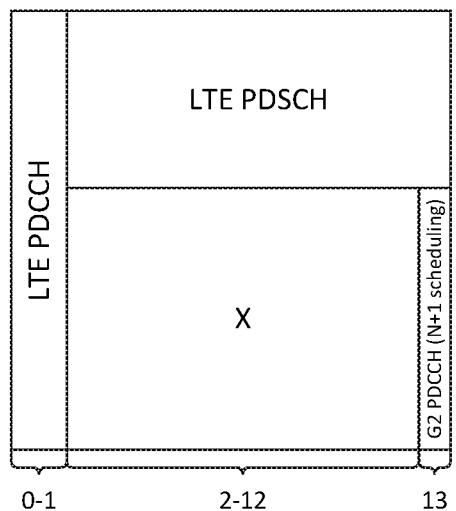
FIGS. 9A and 9B illustrate example resource allocations in scenarios where resource requests from a second group of 5G UEs are pending and resource requests are not pending from a first group of 5G UEs on a current time slot, in accordance with some embodiments.
Figure 9B:
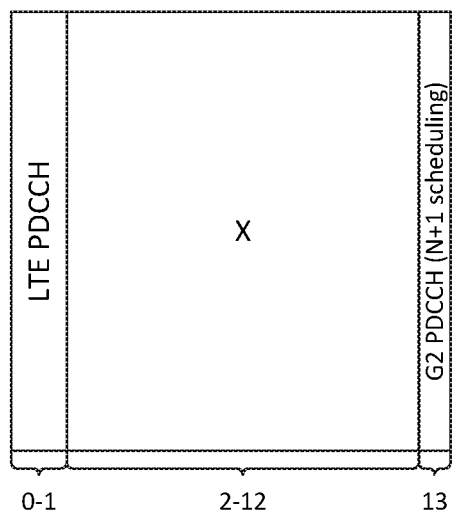

FIGS. 9A and 9B illustrate example allocations in a scenario where requests from Group 2 UEs 103 are pending, and no requests for Group 1 UEs 103 are pending. FIGS. 9A and 9B correspond to, for example, blocks 508 and 510 of process 500, reached after block 504—NO (e.g., where PRBs of Slots 3-12 have not been previously allocated for a PDSCH for Group 2 UEs 103). As another example, FIGS. 9A and 9B correspond to blocks 312 and 314 of process 300, reached after block 304—NO and block 308—NO.

As shown in FIGS. 9A and 9B, for example, some or all PRBs on Symbols 2-12 may be unused, as they were not previously scheduled (e.g., at the previous time slot (e.g., Slot N−1)). In FIG. 9A, DIS 107 may utilize some (but not all PRBs) on Symbol 13 for a PDCCH for Group 2 UEs 103. As noted above, this scheduling may be a pre-scheduling operation, to allocate PRBs (e.g., on Symbols 2-12) on the next time slot (e.g., Slot N+1) for a PDSCH for Group 2 UEs 103. Thus, while these PRBs may be unused (e.g., not allocable for a PDSCH for LTE UEs 105), other PRBs may be available for a PDSCH for LTE UEs 105.

On the other hand, as shown in FIG. 9B, the PDCCH for Group 2 UEs 103 may occupy all PRBs at Symbol 13. Accordingly, no PRBs may be available for a PDSCH for LTE UEs 105, as no PRBs are available across all Symbols 2-13. When allocating PRBs, DIS 107 may attempt to avoid such a scenario, and the logic described above with respect to processes 300, 400, and 500 may aid in such a scenario occurring.

Figure 10:
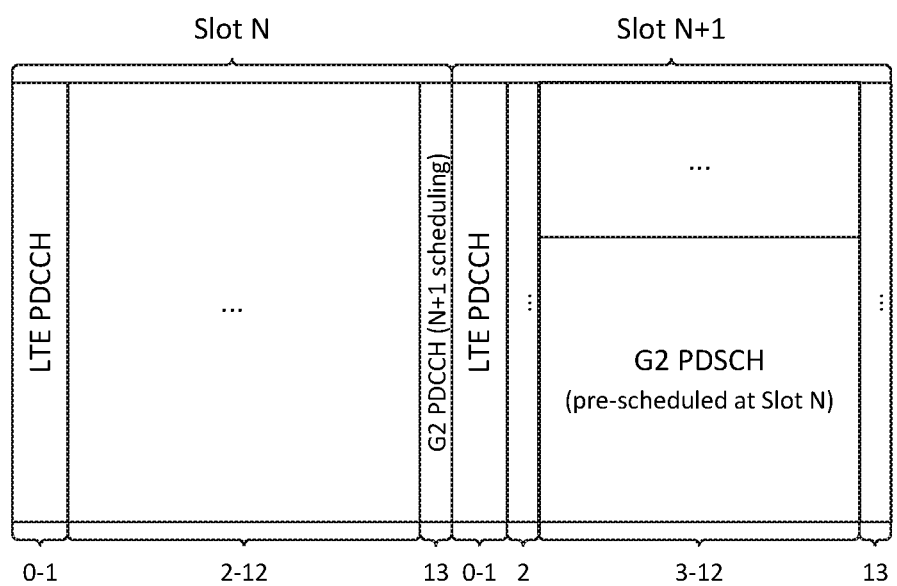
FIG. 10 illustrates the pre-scheduling of resources, on a subsequent time slot, by utilizing resources of a present time slot.

FIG. 10 conceptually illustrates the pre-scheduling of a PDSCH, at Symbols 3-12 of a subsequent time slot (e.g., Slot N+1) at a present time slot (e.g., Slot N). While further details on more specific scenarios are provided below, FIG. 10 generally shows that Symbol 13 may be utilized at a first time slot (i.e., Slot N) for a PDCCH for Group 2 UEs 103, and that the resulting allocation on the subsequent time slot (i.e., Slot N+1) includes an allocation of at least some of the PRBs at Symbols 3-12 for a PDSCH for Group 2 UEs 103. The dots shown in this figure (e.g., at Symbols 2-12 of Slot N, Symbols 2 and 13 of Slot N+1, and further at some PRBs of Symbols 3-12 of Slot N+1) denote PRBs that may be allocated in accordance with some embodiments described herein, and as further described below.

Figure 11:
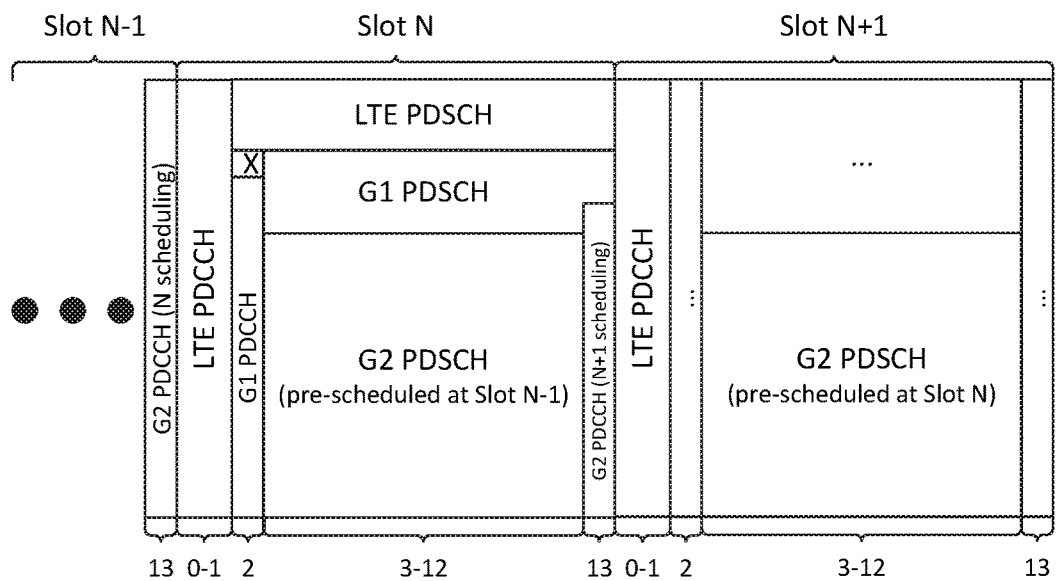
FIG. 11 illustrates an example resource allocation in a scenario where resource requests from the first and second groups of 5G UEs are pending, in accordance with some embodiments.

FIG. 11 conceptually illustrates a scenario in which resource requests are received or pending, at a current time slot (i.e., Slot N) for both Group 1 and Group 2 UEs 103. Further, in this scenario, PRBs at Symbols 3-12 of Slot N may have been pre-scheduled (at previous Slot N−1) for a PDSCH for Group 2 UEs 103. This scenario may correspond to, for example, blocks 306 and 314, after reaching block 304—YES of process 300.

As shown, PRBs of Symbol 2 may be used for a PDCCH for Group 1 UEs 103. As noted above, DIS 107 may prioritize uplink requests for this PDCCH. As further shown, PRBs of Symbol 13 may be used for a PDCCH for Group 2 UEs 103 (e.g., to pre-schedule one or more PRBs of Symbols 3-12 for Slot N+1, to be used as a PDSCH for Group 2 UEs 103). Furthermore, any PRBs at Symbols 3-12 of Slot N that have not previously been allocated for the PDSCH for Group 2 UEs 103 may be used for a PDSCH for Group 1 UEs 103 and/or for a PDSCH for LTE UEs 105. Additionally, or alternatively, PRBs on Slot 13 that are not used for a PDCCH for Group 1 UEs 103 or Group 2 UEs 103, respectively, may be used for a PDSCH for Group 1 UEs 103.

In this figure, an "X" is shown in Symbol 2, to denote that some PRBs of Symbol 2 may not be used for the PDCCH for Group 1 UEs 103. In implementations where all of Symbols 2-13 are required to be used, for PRBs allocated to a PDSCH for LTE UEs 105, such PRBs on Symbol 2 may be unused. In practice, DIS 107 may allocate PRBs on Symbol 2 such that no PRBs remain unused.

Slot N+1 is shown in this figure to show an example allocation of PRBs on Symbols 3-12 of Slot N+1 that were scheduled at Slot N (via the PDCCH at Symbol 13 of Slot N). As denoted by the dots in the figure, the allocations of PRBs at Symbols 2 and 13, as well as the PRBs of Symbols 3-12 that were not previously allocated at Slot N, may be allocated according to embodiments described herein.

Figure 12:
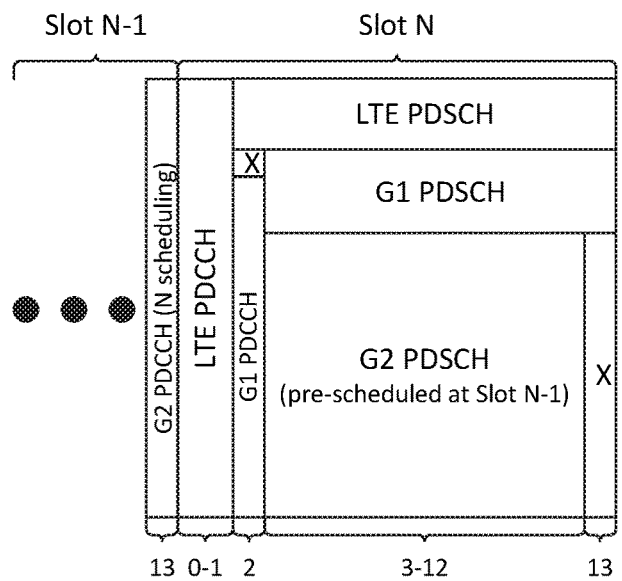
FIG. 12 illustrates an example resource allocation in a scenario where resource requests from the first group of 5G UEs are pending and resource requests are not pending from the second group of 5G UEs on a current time slot, in accordance with some embodiments.

FIG. 12 conceptually illustrates a scenario in which resource requests are received or pending, at a current time slot (i.e., Slot N) for Group 1 UEs 103, and not for Group 2 UEs 103. Further, in this scenario, PRBs at Symbols 3-12 of Slot N may have been pre-scheduled (at previous Slot N−1) for a PDSCH for Group 2 UEs 103. This scenario may correspond to, for example, blocks 406 and 410, after reaching block 404—YES of process 400.

The allocations shown in FIG. 12 may be similar to those shown in FIG. 11, except that PRBs of Symbol 13 may not need to be allocated for a PDCCH for Group 2 UEs 103. As such, some PRBs may be available for a PDSCH for Group 1 UEs 103 and/or for a PDSCH for LTE UEs 105. For example, some or all of the PRBs that were not allocated for the PDCCH for Group 2 UEs 103 (e.g., at Symbols 3-12) may be available for the PDSCH for Group 1 UEs 103 and/or for the PDSCH for LTE UEs 105.

Figure 13A:
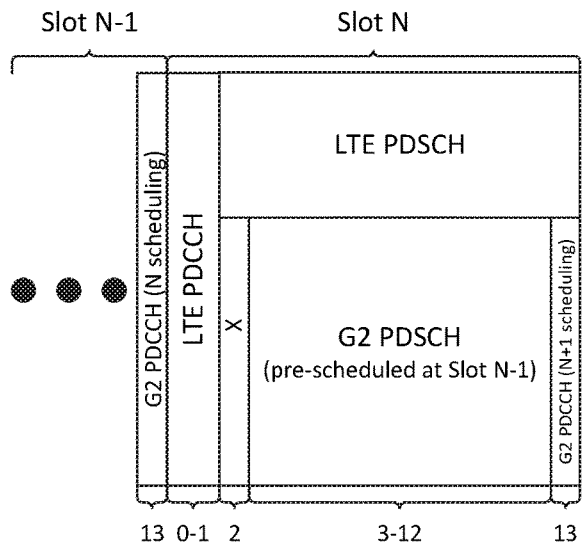
FIGS. 13A-13C illustrate example resource allocations in scenarios where resource requests from the second group of 5G UEs are pending and resource requests are not pending from the first group of 5G UEs on a current time slot, in accordance with some embodiments.
Figure 13B:
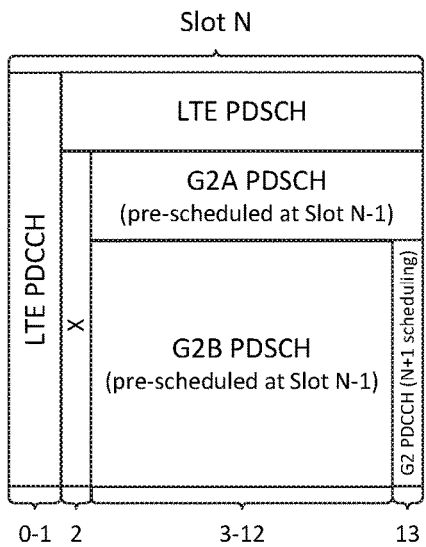
Figure 13C:
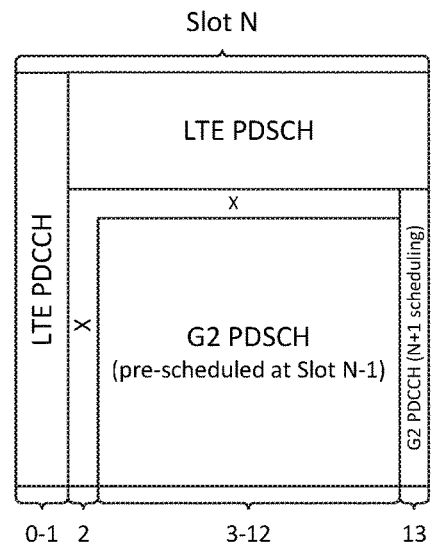

FIGS. 13A-13C conceptually illustrate scenarios in which resource requests are received or pending, at a current time slot (i.e., Slot N) for Group 2 UEs 103, and not for Group 1 UEs 103. Further, in this scenario, PRBs at Symbols 3-12 of Slot N may have been pre-scheduled (at previous Slot N−1) for a PDSCH for Group 2 UEs 103. This scenario may correspond to, for example, blocks 506 and 510, after reaching block 504—YES of process 500.

As shown in FIGS. 13A and 13B, for example, DIS 107 may utilize PRBs of Symbol 13 as a PDCCH for Group 2 UEs 103. In some embodiments, as reflected in FIGS. 13A and 13B, DIS 107 may utilize only PRBs that were also allocated for the PDSCH (at Symbols 3-12) for Group 2 UEs 103. For example, FIG. 13A illustrates a scenario in which DIS 107 allocates the same PRBs, at Symbol 13 for the PDCCH for Group 2 UEs 103, as were allocated at Symbols 3-12 for the PDSCH for Group 2 UEs 103.

FIG. 13B illustrates a scenario in which DIS 107 allocates fewer PRBs, at Symbol 13, for the PDCCH for Group 2 UEs 103, as were allocated at Symbols 3-12 for the PDSCH for Group 2 UEs 103. As such, a first set of PRBs, may be allocated, at Symbols 3-13, for a first set of Group 2 UEs 103, which may be referred to as "Group 2A UEs 103" (shown in the figure as "G2A PDSCH") and a second set of PRBs may be allocated at Symbols 3-12 for a second set of Group 2 UEs 103, which may be referred to as "Group 2B UEs 103" (shown in the figure as "G2B PDSCH"). For example, some implementations require at least two symbols to be used for a PDSCH. Thus, Group 2 UEs 103 that have particular PRBs scheduled at Symbols 3-12 (e.g., Group 2B UEs 103) may not be able to utilize other PRBs at Symbol 13 only. Thus, Group 2A UEs 103 may be scheduled for such other PRBs on Symbols 3-13, in order to utilize these PRBs. The sub-groupings described above (e.g., Group 2A and Group 2B) may, in some embodiments, be used on a per-slot basis. For example, DIS 107 may determine that a particular Group 2 UE 103 should use PRBs at Symbols 3-13 one time slot (and thus, that Group 2 UE 103 would be considered as being a Group 2A UE 103 on that time slot), and that the same particular Group 2 UE 103 should use PRBs at Symbols 3-12 on another time slot (and thus, that Group 2 UE 103 would be considered as being a Group 2B UE 103 on the other time slot).

FIG. 13C illustrates an example scenario in which DIS 107 allocates additional PRBs, at Symbol 13 for the PDCCH for Group 2 UEs 103, than were allocated at Symbols 3-12 for the PDSCH for Group 2 UEs 103. In this scenario, PRB utilization may be reduced compared to the examples shown in FIGS. 13A and 13B, as some PRBs on Symbols 3-12 may remain unused (e.g., in implementations where PRBs are required to be allocated across Symbols 2-13 for a LTE PDSCH).

Figure 14:
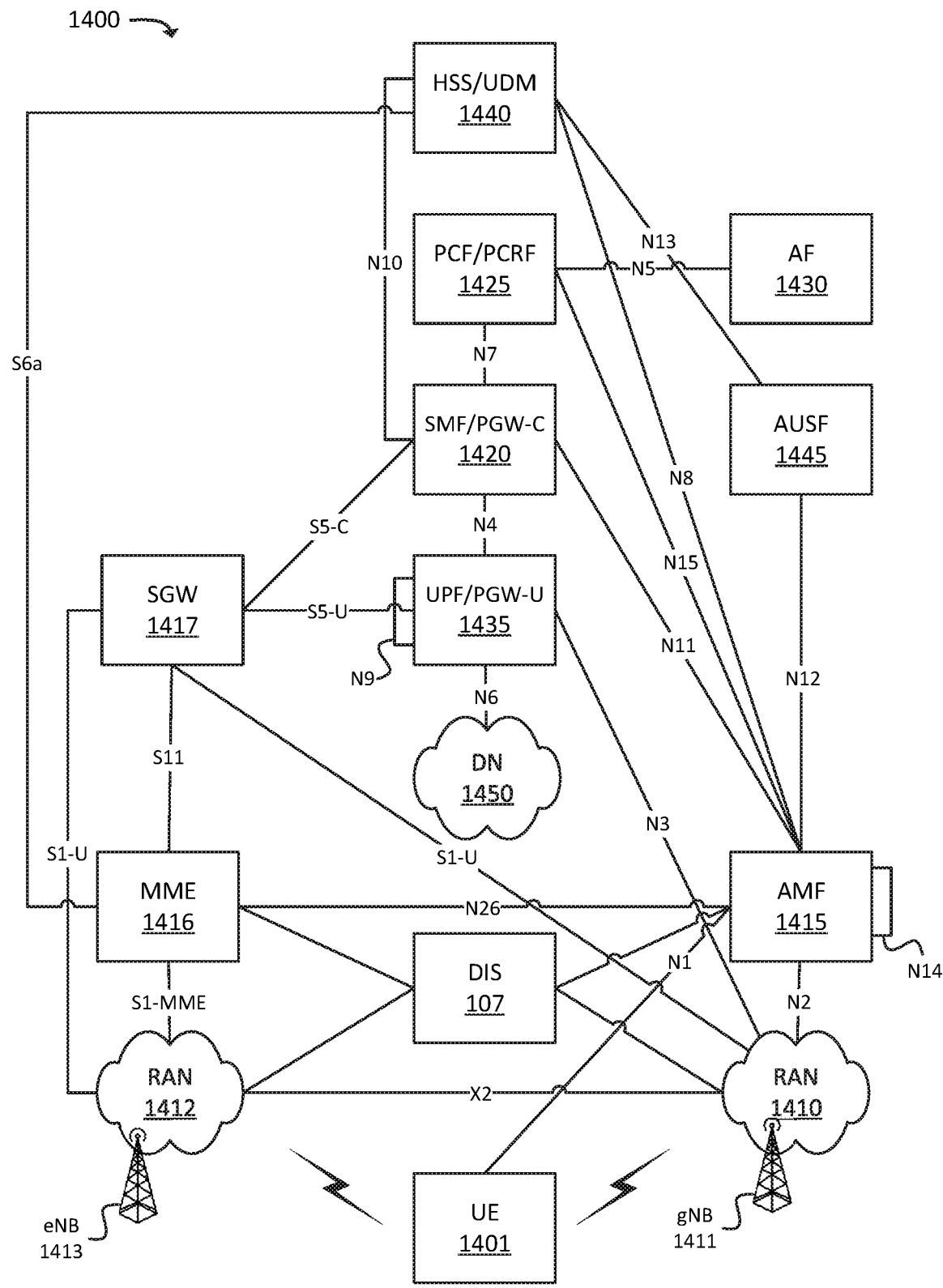
FIG. 14 illustrates an example environment in which one or more embodiments, described herein, may be implemented.

FIG. 14 illustrates an example environment 1400, in which one or more embodiments may be implemented. In some embodiments, environment 1400 may correspond to a 5G network, and/or may include elements of a 5G network. In some embodiments, environment 1400 may correspond to a 5G Non-Standalone ("NSA") architecture, in which a 5G RAT may be used in conjunction with one or more other RATs (e.g., a LTE RAT), and/or in which elements of a 5G core network may be implemented by, may be communicatively coupled with, and/or may include elements of another type of core network (e.g., an evolved packet core ("EPC")).

In some embodiments, concepts described above may apply to another type of architecture, such as a Standalone ("SA") architecture, in which a LTE RAN may be communicatively coupled to a first core network (e.g., an EPC and/or other type of LTE core), and a 5G RAN may be communicatively coupled to a second core network (e.g., a 5G core). While not explicitly discussed here, similar concepts may apply in any suitable architecture or environment in which LTE and 5G RANs are used together to provide wireless service.

As shown, environment 1400 may include UE 1401, RAN 1410 (which may include one or more Next Generation Node Bs ("gNBs") 1411), RAN 1412 (which may include one or more one or more evolved Node Bs ("eNBs") 1413), DIS 107, AMF 1415, MME 1416, Serving Gateway ("SGW") 1417, Session Management Function ("SMF")/Packet Data Network ("PDN") Gateway ("PGW")-Control plane function ("PGW-C") 1420, Policy Control Function ("PCF")/Policy Charging and Rules Function ("PCRF") 1425, Application Function ("AF") 1430, User Plane Function ("UPF")/PGW-User plane function ("PGW-U") 1435, Home Subscriber Server ("HSS")/Unified Data Management ("UDM") 1440, Authentication Server Function ("AUSF") 1445, and Data Network ("DN") 1450.

The quantity of devices and/or networks, illustrated in FIG. 14, is provided for explanatory purposes only. In practice, environment 1400 may include additional devices and/or networks, fewer devices and/or networks, different devices and/or networks, or differently arranged devices and/or networks than illustrated in FIG. 14. For example, while not shown, environment 1400 may include devices that facilitate or enable communication between various components shown in environment 1400, such as routers, modems, gateways, switches, hubs, etc. Alternatively, or additionally, one or more of the devices of environment 1400 may perform one or more functions described as being performed by another one or more of the devices of environment 1400. Devices of environment 1400 may interconnect with each other and/or other devices via wired connections, wireless connections, or a combination of wired and wireless connections. In some implementations, one or more devices of environment 1400 may be physically integrated in, and/or may be physically attached to, one or more other devices of environment 1400.

UE 1401 may include a computation and communication device, such as a wireless mobile communication device that is capable of communicating with RAN 1410 and/or DN 1450. UE 1401 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, an Internet of Things ("IoT") device, a Mobile-to-Mobile ("M2M") device, or another type of mobile computation and communication device. UE 1401 may send traffic to and/or receive traffic (e.g., user plane traffic) from DN 1450 via RAN 1410 and UPF/PGW-U 1435. UE 1401 may correspond to 5G UE 103 and/or LTE UE 105.

RAN 1410 may be, or may include, a 5G RAN that includes one or more base stations (e.g., one or more gNBs 1411), via which UE 1401 may communicate with one or more other elements of environment 1400. UE 1401 may communicate with RAN 1410 via an air interface (e.g., as provided by gNB 1411). For instance, RAN 1410 may receive traffic (e.g., voice call traffic, data traffic, messaging traffic, signaling traffic, etc.) from UE 1401 via the air interface, and may communicate the traffic to UPF/PGW-U 1435, and/or one or more other devices or networks. Similarly, RAN 1410 may receive traffic intended for UE 1401 (e.g., from UPF/PGW-U 1435, AMF 1415, and/or one or more other devices or networks) and may communicate the traffic to UE 1401 via the air interface.

RAN 1412 may be, or may include, an LTE RAN that includes one or more base stations (e.g., one or more eNBs 1413), via which UE 1401 may communicate with one or more other elements of environment 1400. UE 1401 may communicate with RAN 1412 via an air interface (e.g., as provided by eNB 1413). For instance, RAN 1410 may receive traffic (e.g., voice call traffic, data traffic, messaging traffic, signaling traffic, etc.) from UE 1401 via the air interface, and may communicate the traffic to UPF/PGW-U 1435, and/or one or more other devices or networks. Similarly, RAN 1410 may receive traffic intended for UE 1401 (e.g., from UPF/PGW-U 1435, SGW 1417, and/or one or more other devices or networks) and may communicate the traffic to UE 1401 via the air interface.

In some embodiments, RANs 1410 and/or 1412 may implement DSS, and may provide connectivity according to multiple RATs (e.g., a 5G RAT and a LTE RAT). Accordingly, gNB 1411 and/or eNB 1413 may be communicatively coupled to, and/or may implement functionality described above with respect to, DIS 107, which may perform scheduling and/or resource allocation in accordance with embodiments described above.

AMF 1415 may include one or more devices, systems, Virtualized Network Functions ("VNFs"), etc., that perform operations to register UE 1401 with the 5G network, to establish bearer channels associated with a session with UE 1401, to hand off UE 1401 from the 5G network to another network, to hand off UE 1401 from the other network to the 5G network, manage mobility of UE 1401 between RANs 1410 and/or gNBs 1411, and/or to perform other operations. In some embodiments, the 5G network may include multiple AMFs 1415, which communicate with each other via the N14 interface (denoted in FIG. 14 by the line marked "N14" originating and terminating at AMF 1415).

MME 1416 may include one or more devices, systems, VNFs, etc., that perform operations to register UE 1401 with the EPC, to establish bearer channels associated with a session with UE 1401, to hand off UE 1401 from the EPC to another network, to hand off UE 1401 from another network to the EPC, manage mobility of UE 1401 between RANs 1412 and/or eNBs 1413, and/or to perform other operations.

SGW 1417 may include one or more devices, systems, VNFs, etc., that aggregate traffic received from one or more eNBs 1413 and send the aggregated traffic to an external network or device via UPF/PGW-U 1435. Additionally, SGW 1417 may aggregate traffic received from one or more UPF/PGW-Us 1435 and may send the aggregated traffic to one or more eNBs 1413. SGW 1417 may operate as an anchor for the user plane during inter-eNB handovers and as an anchor for mobility between different telecommunication networks or RANs (e.g., RANs 1410 and 1412).

SMF/PGW-C 1420 may include one or more devices, systems, VNFs, etc., that gather, process, store, and/or provide information in a manner described herein. SMF/PGW-C 1420 may, for example, facilitate in the establishment of communication sessions on behalf of UE 1401. In some embodiments, the establishment of communications sessions may be performed in accordance with one or more policies provided by PCF/PCRF 1425.

PCF/PCRF 1425 may include one or more devices, systems, VNFs, etc., that aggregate information to and from the 5G network and/or other sources. PCF/PCRF 1425 may receive information regarding policies and/or subscriptions from one or more sources, such as subscriber databases and/or from one or more users (such as, for example, an administrator associated with PCF/PCRF 1425).

AF 1430 may include one or more devices, systems, VNFs, etc., that receive, store, and/or provide information that may be used in determining parameters (e.g., quality of service parameters, charging parameters, or the like) for certain applications.

UPF/PGW-U 1435 may include one or more devices, systems, VNFs, etc., that receive, store, and/or provide data (e.g., user plane data). For example, UPF/PGW-U 1435 may receive user plane data (e.g., voice call traffic, data traffic, etc.), destined for UE 1401, from DN 1450, and may forward the user plane data toward UE 1401 (e.g., via RAN 1410, SMF/PGW-C 1420, and/or one or more other devices). In some embodiments, multiple UPFs 1435 may be deployed (e.g., in different geographical locations), and the delivery of content to UE 1401 may be coordinated via the N9 interface (e.g., as denoted in FIG. 14 by the line marked "N9" originating and terminating at UPF/PGW-U 1435). Similarly, UPF/PGW-U 1435 may receive traffic from UE 1401 (e.g., via RAN 1410, SMF/PGW-C 1420, and/or one or more other devices), and may forward the traffic toward DN 1450. In some embodiments, UPF/PGW-U 1435 may communicate (e.g., via the N4 interface) with SMF/PGW-C 1420, regarding user plane data processed by UPF/PGW-U 1435.

HSS/UDM 1440 and AUSF 1445 may include one or more devices, systems, VNFs, etc., that manage, update, and/or store, in one or more memory devices associated with AUSF 1445 and/or HSS/UDM 1440, profile information associated with a subscriber. AUSF 1445 and/or HSS/UDM 1440 may perform authentication, authorization, and/or accounting operations associated with the subscriber and/or a communication session with UE 1401.

DN 1450 may include one or more wired and/or wireless networks. For example, DN 1450 may include an Internet Protocol ("IP")-based PDN, a wide area network ("WAN") such as the Internet, a private enterprise network, and/or one or more other networks. UE 1401 may communicate, through DN 1450, with data servers, other UEs 1401, and/or to other servers or applications that are coupled to DN 1450. DN 1450 may be connected to one or more other networks, such as a public switched telephone network ("PSTN"), a public land mobile network ("PLMN"), and/or another network. DN 1450 may be connected to one or more devices, such as content providers, applications, web servers, and/or other devices, with which UE 1401 may communicate.

Figure 15:
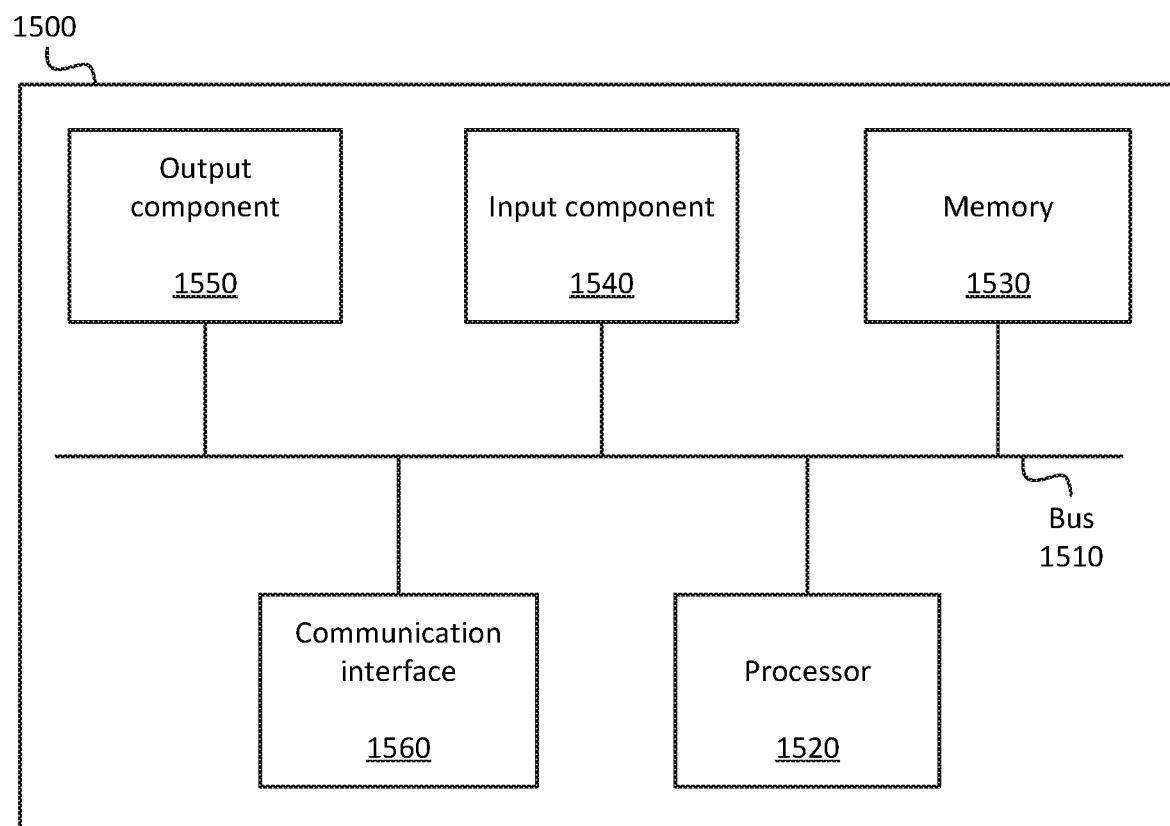
FIG. 15 illustrates example functional components of one or more devices, in accordance with one or more embodiments described herein.

FIG. 15 illustrates example components of device 1500. One or more of the devices described above may include one or more devices 1500. Device 1500 may include bus 1510, processor 1520, memory 1530, input component 1540, output component 1550, and communication interface 1560. In another implementation, device 1500 may include additional, fewer, different, or differently arranged components.

Bus 1510 may include one or more communication paths that permit communication among the components of device 1500. Processor 1520 may include a processor, microprocessor, or processing logic that may interpret and execute instructions. Memory 1530 may include any type of dynamic storage device that may store information and instructions for execution by processor 1520, and/or any type of non-volatile storage device that may store information for use by processor 1520.

Input component 1540 may include a mechanism that permits an operator to input information to device 1500, such as a keyboard, a keypad, a button, a switch, etc. Output component 1550 may include a mechanism that outputs information to the operator, such as a display, a speaker, one or more light emitting diodes ("LEDs"), etc.

Communication interface 1560 may include any transceiver-like mechanism that enables device 1500 to communicate with other devices and/or systems. For example, communication interface 1560 may include an Ethernet interface, an optical interface, a coaxial interface, or the like. Communication interface 1560 may include a wireless communication device, such as an infrared ("IR") receiver, a Bluetooth® radio, or the like. The wireless communication device may be coupled to an external device, such as a remote control, a wireless keyboard, a mobile telephone, etc.

In some embodiments, device 1500 may include more than one communication interface 1560. For instance, device 1500 may include an optical interface and an Ethernet interface.

Device 1500 may perform certain operations relating to one or more processes described above. Device 1500 may perform these operations in response to processor 1520 executing software instructions stored in a computer-readable medium, such as memory 1530. A computer-readable medium may be defined as a non-transitory memory device. A memory device may include space within a single physical memory device or spread across multiple physical memory devices. The software instructions may be read into memory 1530 from another computer-readable medium or from another device. The software instructions stored in memory 1530 may cause processor 1520 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
    one or more processors configured to:
        receive a request to allocate, for a User Equipment ("UE"), physical downlink radio frequency ("RF") resources of a base station associated with a radio access network ("RAN") of a wireless network;
        allocate, based on the request, a first set of downlink Physical Resource Blocks ("PRBs") at a first time slot to indicate, to the UE, a second set of downlink PRBs, at a subsequent second time slot, that will be used to provide downlink data to the UE,
            wherein the first and second time slots are each subdivided into a plurality of symbols, and wherein allocating the first set of PRBs includes allocating the first set of PRBs at a last symbol of the plurality of symbols of the first time slot; and
        allocate, at the second subsequent time slot, the second set of downlink PRBs to provide the downlink data to the UE.

2. The device of claim 1, wherein the plurality of symbols consist of fourteen symbols, and wherein the last symbol is a fourteenth symbol of the fourteen symbols of the first time slot.

3. The device of claim 2, wherein allocating the second set of downlink PRBs includes allocating PRBs on symbols other than the first, second, third and fourteenth symbols of the fourteen symbols of the second time slot for the downlink data for the UE.

4. A device, comprising:
    one or more processors configured to:
        receive a first request to allocate, for a first User Equipment ("UE"), physical downlink radio frequency ("RF") resources of a base station associated with a radio access network ("RAN") of a wireless network;
        allocate, based on the first request, a first set of downlink Physical Resource Blocks ("PRBs") at a first time slot to indicate, to the first UE, a second set of downlink PRBs, at a subsequent second time slot, that will be used to provide downlink data to the first UE;
        allocate, at the second subsequent time slot, the second set of downlink PRBs to provide the downlink data to the first UE;
        receive a second request to allocate, for a second UE, physical downlink RF resources of the base station;
        allocate, based on the second request, a third set of PRBs at the first time slot to indicate, to the second UE, a fourth set of downlink PRBs, at the first time slot, that will be used to provide downlink data to the second UE; and
        allocate, at the first time slot, the fourth set of downlink PRBs to provide the downlink data to the second UE.

5. The device of claim 4, wherein the allocated first set of PRBs correspond to a Physical Downlink Control Channel ("PDCCH"), and wherein the allocated second set of PRBs correspond to a Physical Downlink Shared Channel ("PDSCH").

6. A device, comprising:
    one or more processors configured to:
        receive a first request to allocate, for a first User Equipment ("UE"), physical downlink radio frequency ("RF") resources of a base station associated with a radio access network ("RAN") of a wireless network;
        allocate, based on the first request, a first set of downlink Physical Resource Blocks ("PRBs") at a first time slot to indicate, to the first UE, a second set of downlink PRBs, at a subsequent second time slot, that will be used to provide downlink data to the first UE;
        allocate, at the second subsequent time slot, the second set of downlink PRBs to provide the downlink data to the first UE;
        identify a second request, pending during the second time slot, to allocate physical RF resources for a second UE;
        allocate, based on the second request, a third set of PRBs at the second time slot to indicate, to the second UE, a fourth set of downlink PRBs, at the second time slot, that will be used to provide downlink data to the second UE; and
        allocate, at the second time slot, the fourth set of downlink PRBs to provide the downlink data to the second UE.

7. The device of claim 6, wherein allocating the second set of downlink PRBs includes allocating PRBs on symbols other than first and last symbols of the second time slot for the downlink data for the first UE.

8. The device of claim 6, wherein the allocated first set of PRBs correspond to a Physical Downlink Control Channel ("PDCCH"), and wherein the allocated second set of PRBs correspond to a Physical Downlink Shared Channel ("PDSCH").

9. A non-transitory computer-readable medium, storing a plurality of processor-executable instructions to:
    receive a request to allocate, for a User Equipment ("UE"), physical downlink radio frequency ("RF") resources of a base station associated with a radio access network ("RAN") of a wireless network;
    allocate, based on the request, a first set of downlink Physical Resource Blocks ("PRBs") at a first time slot to indicate, to the UE, a second set of downlink PRBs, at a subsequent second time slot, that will be used to provide downlink data to the UE, wherein the first and second time slots are each subdivided into a plurality of symbols, and wherein allocating the first set of PRBs includes allocating the first set of PRBs at a last symbol of the plurality of symbols of the first time slot; and allocate, at the second subsequent time slot, the second set of downlink PRBs to provide the downlink data to the UE.

10. The non-transitory computer-readable medium of claim 9, wherein the plurality of symbols consist of fourteen symbols, and wherein the last symbol is a fourteenth symbol of the fourteen symbols of the first time slot.

11. The non-transitory computer-readable medium of claim 10, wherein allocating the second set of downlink PRBs includes allocating PRBs on symbols other than the first, second, third and fourteenth symbols of the fourteen symbols of the second time slot for the downlink data for the UE.

12. The non-transitory computer-readable medium of claim 9, wherein the allocated first set of PRBs correspond to a Physical Downlink Control Channel ("PDCCH"), and wherein the allocated second set of PRBs correspond to a Physical Downlink Shared Channel ("PDSCH").

13. The non-transitory computer-readable medium of claim 9, wherein the UE is a first UE, wherein the request is a first request, wherein the plurality of processor-executable instructions further include processor-executable instructions to:

receive a second request to allocate, for a second UE, physical downlink RF resources of the base station;

allocate, based on the second request, a third set of PRBs at the first time slot to indicate, to the second UE, a fourth set of downlink PRBs, at the first time slot, that will be used to provide downlink data to the second UE; and allocate, at the first time slot, the fourth set of downlink PRBs to provide the downlink data to the second UE.

14. The non-transitory computer-readable medium of claim 9, wherein the request is a first request, wherein the UE is a first UE, wherein the plurality of processor-executable instructions further include processor-executable instructions to:

identify a second request, pending during the second time slot, to allocate physical RF resources for a second UE;

allocate, based on the second request, a third set of PRBs at the second time slot to indicate, to the second UE, a fourth set of downlink PRBs, at the second time slot, that will be used to provide downlink data to the second UE; and allocate, at the second time slot, the fourth set of downlink PRBs to provide the downlink data to the second UE.

15. A method, comprising:

receiving a first request to allocate, a first User Equipment ("UE"), physical downlink radio frequency ("RF") resources of a base station associated with a radio access network ("RAN") of a wireless network;

allocating, based on the first request, a first set of downlink Physical Resource Blocks ("PRBs") at a first time slot to indicate, to the first UE, a second set of downlink PRBs, at a subsequent second time slot, that will be used to provide downlink data to the first UE;

allocating, at the second subsequent time slot, the second set of downlink PRBs to provide the downlink data to the UE;

receiving a second request to allocate, for a second UE, physical downlink RF resources of the base station;

allocating, based on the second request, a third set of PRBs at the first time slot to indicate, to the second UE, a fourth set of downlink PRBs, at the first time slot, that will be used to provide downlink data to the second UE; and allocating, at the first time slot, the fourth set of downlink PRBs to provide the downlink data to the second UE.

16. The method of claim 15, wherein the first and second time slots are each subdivided into a fourteen symbols, wherein allocating the first set of PRBs includes allocating the first set of PRBs at a fourteenth symbol of the first time slot.

17. The method of claim 16, wherein allocating the second set of downlink PRBs includes allocating PRBs on symbols other than the first, second, third and fourteenth symbols of the fourteen symbols of the second time slot for the downlink data for the first UE.

18. A method, comprising:

receiving a first request to allocate, for a first User Equipment ("UE"), physical downlink radio frequency ("RF") resources of a base station associated with a radio access network ("RAN") of a wireless network;

allocating, based on the first request, a first set of downlink Physical Resource Blocks ("PRBs") at a first time slot to indicate, to the first UE, a second set of downlink PRBs, at a subsequent second time slot, that will be used to provide downlink data to the first UE;

allocating, at the second subsequent time slot, the second set of downlink PRBs to provide the downlink data to the first UE;

identifying a second request, pending during the second time slot, to allocate physical RF resources for a second UE;

allocating, based on the second request, a third set of PRBs at the second time slot to indicate, to the second UE, a fourth set of downlink PRBs, at the second time slot, that will be used to provide downlink data to the second UE; and allocating, at the second time slot, the fourth set of downlink PRBs to provide the downlink data to the second UE.

19. The method of claim 18, wherein the allocated first set of PRBs correspond to a Physical Downlink Control Channel ("PDCCH"), and wherein the allocated second set of PRBs correspond to a Physical Downlink Shared Channel ("PDSCH").

20. The method of claim 18, wherein allocating the second set of downlink PRBs includes allocating PRBs on symbols other than first and last symbols of the second time slot for the downlink data for the first UE.

* * * * *